(12) United States Patent
Debrunner et al.

(10) Patent No.: US 8,929,176 B2
(45) Date of Patent: Jan. 6, 2015

(54) BUILDING A THREE-DIMENSIONAL MODEL OF AN UNDERWATER STRUCTURE

(75) Inventors: Christian H. Debrunner, Conifer, CO (US); Alan K. Fettinger, Highlands Ranch, CO (US); Christopher L. Baker, Allison Park, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 500 days.

(21) Appl. No.: 13/280,932

(22) Filed: Oct. 25, 2011

(65) Prior Publication Data

US 2012/0099402 A1 Apr. 26, 2012

Related U.S. Application Data

(60) Provisional application No. 61/406,444, filed on Oct. 25, 2010.

(51) Int. Cl.
*H04B 11/00* (2006.01)
*G01S 15/89* (2006.01)
*G06K 9/00* (2006.01)
*G01S 1/72* (2006.01)

(52) U.S. Cl.
CPC . *H04B 11/00* (2013.01); *G01S 1/72* (2013.01); *G01S 15/89* (2013.01); *G06K 9/00201* (2013.01)
USPC .......................................................... 367/134

(58) Field of Classification Search
USPC .......................................................... 367/134
See application file for complete search history.

(56) References Cited

U.S. PATENT DOCUMENTS

| 6,084,827 | A | 7/2000 | Johnson |
| 7,184,926 | B2 | 2/2007 | Jarrott |
| 7,257,483 | B2 * | 8/2007 | Blain et al. ..................... 701/536 |
| 8,625,854 | B2 * | 1/2014 | Valkenburg et al. .......... 382/106 |
| 2007/0106462 | A1 | 5/2007 | Blain et al. |

(Continued)

FOREIGN PATENT DOCUMENTS

| CN | 101672916 | 3/2010 |
| CN | 101788666 | 7/2010 |
| WO | 99/66343 | 12/1999 |
| WO | 01/94827 A2 | 12/2001 |

OTHER PUBLICATIONS

International Search Report for international application No. PCT/US2011/057693, dated Jan. 30, 2012 (5 pages).

(Continued)

*Primary Examiner* — Mark Hellner
*Assistant Examiner* — James Hulka
(74) *Attorney, Agent, or Firm* — Hamre, Schumann, Mueller & Larson, P.C.

(57) ABSTRACT

A method and system are described that can be used for scanning underwater structures. The method and system allow a user to gain a better understanding of an existing underwater structure. For example, the method and system allow for building a three dimensional model of an underwater structure. A sonar wave is directed toward an underwater structure, and a reflected sonar wave is received. Initial 3D data points are obtained from the reflected sonar wave, and are configured to provide a three-dimensional image of the underwater structure. A working alignment model of the underwater structure is generated by the initial data points. As new 3D sonar data is collected, the new 3D sonar data is aligned with and added to the alignment model.

13 Claims, 5 Drawing Sheets

(56) References Cited

U.S. PATENT DOCUMENTS

| | | |
|---|---|---|
| 2007/0159922 A1 | 7/2007 | Zimmerman et al. |
| 2009/0031940 A1 | 2/2009 | Stone et al. |
| 2009/0323121 A1 | 12/2009 | Valkenburg et al. |
| 2012/0099395 A1 | 4/2012 | Debrunner et al. |
| 2012/0099398 A1 | 4/2012 | Lichter et al. |
| 2012/0099399 A1 | 4/2012 | Lichter et al. |
| 2012/0099400 A1 | 4/2012 | Debrunner et al. |
| 2012/0101715 A1 | 4/2012 | Tangirala et al. |

OTHER PUBLICATIONS

Written Opinion of the International Searching Authority for international application No. PCT/US2011/057693, dated Jan. 30, 2012 (5 pages).

Christopher N. Roman, "Self Consistent Bathymetric Mapping from Robotic Vehicles in the Deep Ocean," doctoral thesis submitted to the Massachusetts Institute of Technology and Woods Hole Oceanographic Institution, Jun. 2005 (130 pages).

Oscar Pizarro et al., "Large Area 3-D Reconstructions From Underwater Optical Surveys," IEEE Journal of Oceanic Engineering, vol. 34, No. 2, Apr. 2009 (p. 150-169).

Juan Manuel Saez et al., "Underwater 3D SLAM through Entropy Minimization," Proceedings of the 2006 IEEE International Conference on Robotics and Automation, May 2006 (p. 3562-3567).

R.K. Hansen et al, "Mosaicing of 3D sonar data sets—techniques and applications", Proceedings of MTS/IEEE Oceans 2005, vol. 3, pp. 2326-2333, Washington DC Sep. 18-23, 2005.

P.G. Auran and K.E. Malvig, "Clustering and feature extraction in a 3D real-time echo management framework", Proceedings of the Symposium on Autonomous Underwater Vehicle Technology (AUV '96), pp. 300-307, IEEE, Jun. 2-6, 1996.

B. Kamgar-Parsi, L.J. Rosenblum and E.O. Belcher, "Underwater imaging with a moving acoustic lens", IEEE Transactions on Image Processing, vol. 7, Issue 1, pp. 91-99, Jan. 1998.

Supplementary European Search Report for European application No. 11838533.5, dated Nov. 12, 2014 (7 pages).

Chinese Office Action for Chinese Application No. 201180051192.3, dated Nov. 14, 2014, 19 pgs.

* cited by examiner

BUILDING A THREE-DIMENSIONAL MODEL OF AN UNDERWATER STRUCTURE

This application claims the benefit of priority of U.S. Provisional Application No. 61/406,444, filed on Oct. 25, 2010, and entitled BUILDING A THREE DIMENSIONAL MODEL OF AN UNDERWATER STRUCTURE, and which is herewith incorporated by reference in its entirety.

FIELD

This disclosure relates to the collection of sonar data from scanning underwater structures to build a three dimensional model of existing underwater structures from the information collected.

BACKGROUND

There are a number of underwater structures and other equipment for which one might need to gain a better understanding. This better understanding can be useful for example to obtain information of an underwater structure so that a model of the underwater structure may be built. Current methods of inspecting underwater structures include inspections using divers, remotely operated vehicles (ROVs) and autonomous underwater vehicles (AUVs). Such a problem of building a model is often called simultaneous localization and mapping (SLAM).

SUMMARY

A method and system is described that can be used for scanning underwater structures, to gain a better understanding of underwater structures, such as for example, for the purpose building a three dimensional model of an underwater structure, which can be used for directing inspection, repair, and manipulation of the underwater structure.

The method and system herein can be used to scan any type of underwater structure. For example, underwater structures include man-made objects, such as offshore oil platform support structures and piers and oil-well related equipment, as well as natural objects such as underwater mountain ranges, and can include structures that are wholly or partially underwater. Underwater structure can also include both stationary and non-stationary structures, for example that may experience drift in the underwater environment. More generally, underwater structure is meant as any arbitrary three dimensional structure with depth variation and that may have varying complexity.

As used herein, the term underwater includes any type of underwater environment in which an underwater structure may be located and may need to be scanned using the system described herein, including, but not limited to, salt-water locations such as seas and oceans, and freshwater locations.

In one embodiment, a method of building a three dimensional model of an underwater structure includes directing an acoustic sonar wave toward an underwater structure, and receiving a response from directing the acoustic sonar wave toward the underwater structure. The acoustic sonar is configured as a three dimensional image based sonar, where a pulse at a certain frequency provides data for a receiver to generate a three dimensional image. That is, data points are obtained from the response, and the data points are configured to provide a three-dimensional image of the underwater structure. An alignment model of the underwater structure is generated based from the data points obtained. Another acoustic sonar wave is directed toward an underwater structure and another response is received, the additional acoustic sonar wave is also a three dimensional image based sonar wave. New data points are obtained from the additional response, and the new data points are configured to provide a three-dimensional image of the underwater structure. A sample of the new data points obtained are aligned to the alignment model, and a three dimensional model of the underwater structure is build using the new data points.

In one embodiment, it is desirable to have a sonar sensor system, which can carry out the model building methods onboard an underwater vehicle. The underwater vehicle is, for example but not limited to, one of an autonomous underwater vehicle (AUV) and a remotely operated underwater vehicle (ROV). As used herein, an ROV is a remotely operated underwater vehicle that is tethered by a cable to a host, such as a surface ship. The ROV is unoccupied and is operated by a pilot aboard the host. The tether can carry, for example, electrical power (in place of or to supplement battery power on the self-contained system), video and data signals back and forth between the host and the ROV. As used herein, an AUV is an autonomous underwater vehicle that is unmanned and is not tethered to a host vessel.

With reference to the sonar system, in one embodiment, such a system for building a three dimensional model of an underwater structure includes a sensor onboard an underwater vehicle. The sensor is configured to direct an acoustic sonar wave toward an underwater structure. The reflected acoustic sonar wave is processed into a three dimensional (3D) image. A data storage is present onboard the underwater vehicle that is configured to receive the 3D image from the sensor.

A data processor is also present onboard the underwater vehicle. The data processor is configured to obtain sensor data points from the data storage, the data points are configured to provide a three-dimensional image of the underwater structure. The processor is configured to generate an alignment model of the underwater structure from the data points obtained.

When new sonar data is obtained by the sensor, the data storage can receive a 3D image of the underwater structure from the sensor, the processor is configured to obtain the new 3D image data points from the data storage. The processor is configured to align the new data points obtained to the alignment model, and to add the aligned data points to the alignment model. At the completion of this process, the alignment model represents a three dimensional model of the underwater structure.

DETAILED DESCRIPTION

Figure 1:
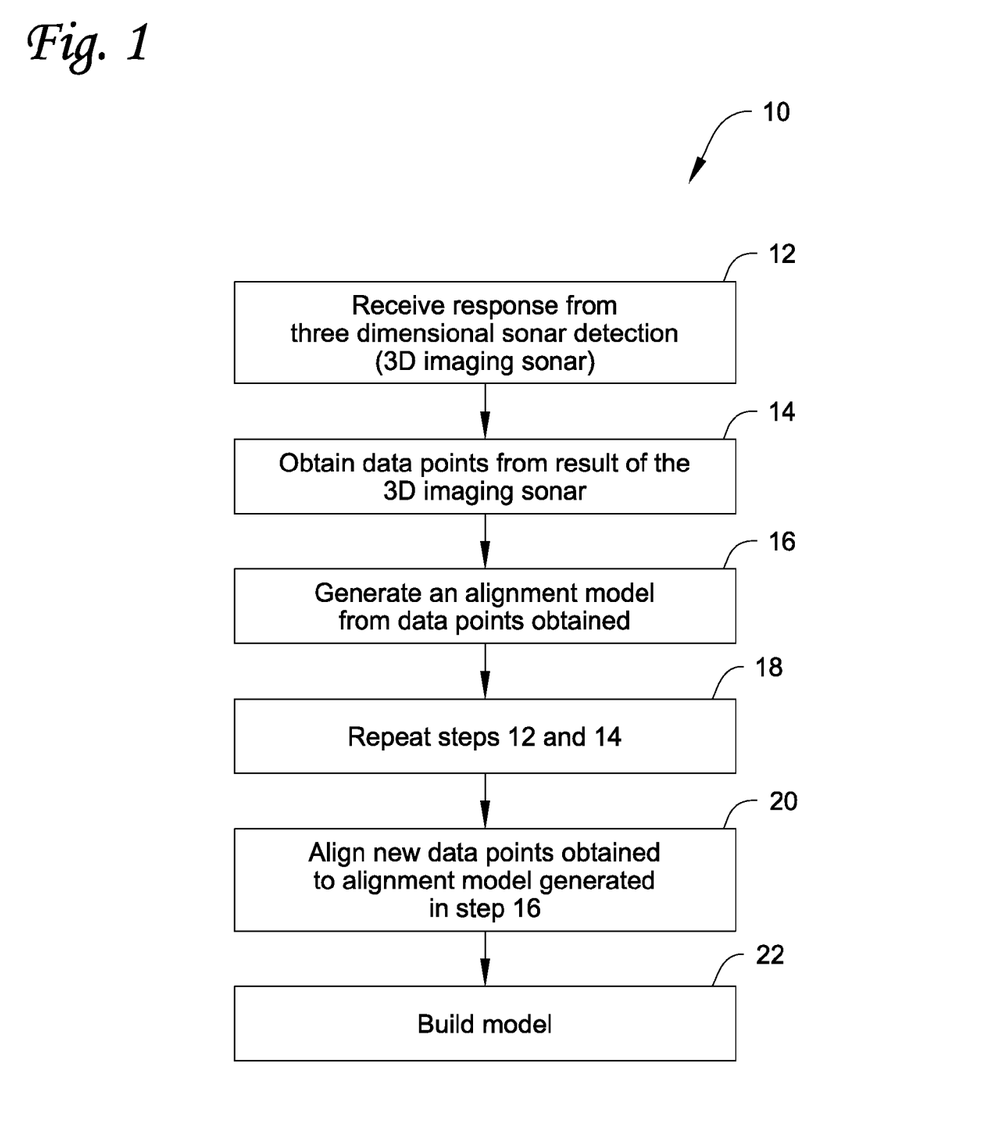
FIG. 1 shows a flow diagram of one embodiment of a method for building a three-dimensional model of an underwater structure.

FIG. 1 shows a flow diagram of one embodiment of a method 10 for building a three dimensional model of an existing underwater structure. In general, the method is carried out by using an underwater vehicle's inertial navigation capability along with a feature based sensor, e.g. sonar imaging sensor, and a processor that generates an alignment model or working model of the underwater structure. Newly obtained sonar data is aligned to the alignment model. The working model is updated and referenced when new data is obtained, thus building the three dimensional model of the underwater structure. In many circumstances, the model building can be performed onboard an underwater vehicle and in real time. For example, the process of sending out a 3D sonar ping, receiving data from it, filtering the data, and aligning it to the prior model may be completed in about one second or less.

The method 10 includes directing an acoustic sonar wave toward an underwater structure. After directing the acoustic sonar wave, a response is received 12 from directing the acoustic sonar wave toward the underwater structure. For example, at 12, a sonar wave is reflected from the structure and received. It will be appreciated that the received acoustic sonar wave is processed by the sonar into a three dimensional image, i.e. the sonar is a three dimensional (3D) imaging sonar. The 3D imaging sonar can be any 3D sonar that creates a 3D image from the reflected sonar signal of a single transmitted sonar pulse or ping. An example of a suitable 3D sonar is the CodaOctopus Echoscope available from CodaOctopus Products. It will be appreciated that the 3D sonar can be adjusted and arranged such that it points toward an underwater structure, so that it can send a ping(s) at the underwater structure and can be oriented at a various desired angles relative to vertical, and various viewpoints and distances from the underwater structure.

It will be appreciated that inertial navigation systems are known, and are used to determine the position, orientation, and velocity (e.g. direction and speed of movement) of the underwater vehicle. An inertial navigation system can include a Doppler velocity log (DVL) unit that faces downward for use in determining velocity, but it will be appreciated that an inertial navigation system can be any system that can determine position, orientation, and velocity (e.g. direction and speed of movement). An example of a suitable inertial navigation system is the SEA DeVil available from Kearfott Corporation.

Once the response is received by the three dimensional imaging sonar, data points are obtained 14 which are configured to provide a three-dimensional image of the underwater structure. The data points are then used to generate a working alignment model 16, which will be used in alignment of subsequent 3D images as the pre-existing 3D model of the underwater structure. Additional sonar data is collected 18 by repeating steps 12 and 14, and new 3D data points are obtained which are aligned 20 and added 22 to the alignment model.

With reference to the alignment step 20, in one embodiment the additional 3D sonar data is aligned with the alignment model. During alignment, an iterative process of fitting the data with the alignment model is employed. In some embodiments, this iterative process is based on data from multiple 3D sonar pings. By aligning the new data to the alignment model and adding the aligned data to the alignment model, the three dimensional model of the underwater structure is built 22. As the alignment model is a working model of the three dimensional underwater structure, the model being built with new incoming sonar data is used to update the alignment model, so it can be used to align to additional collected data.

Figure 2:
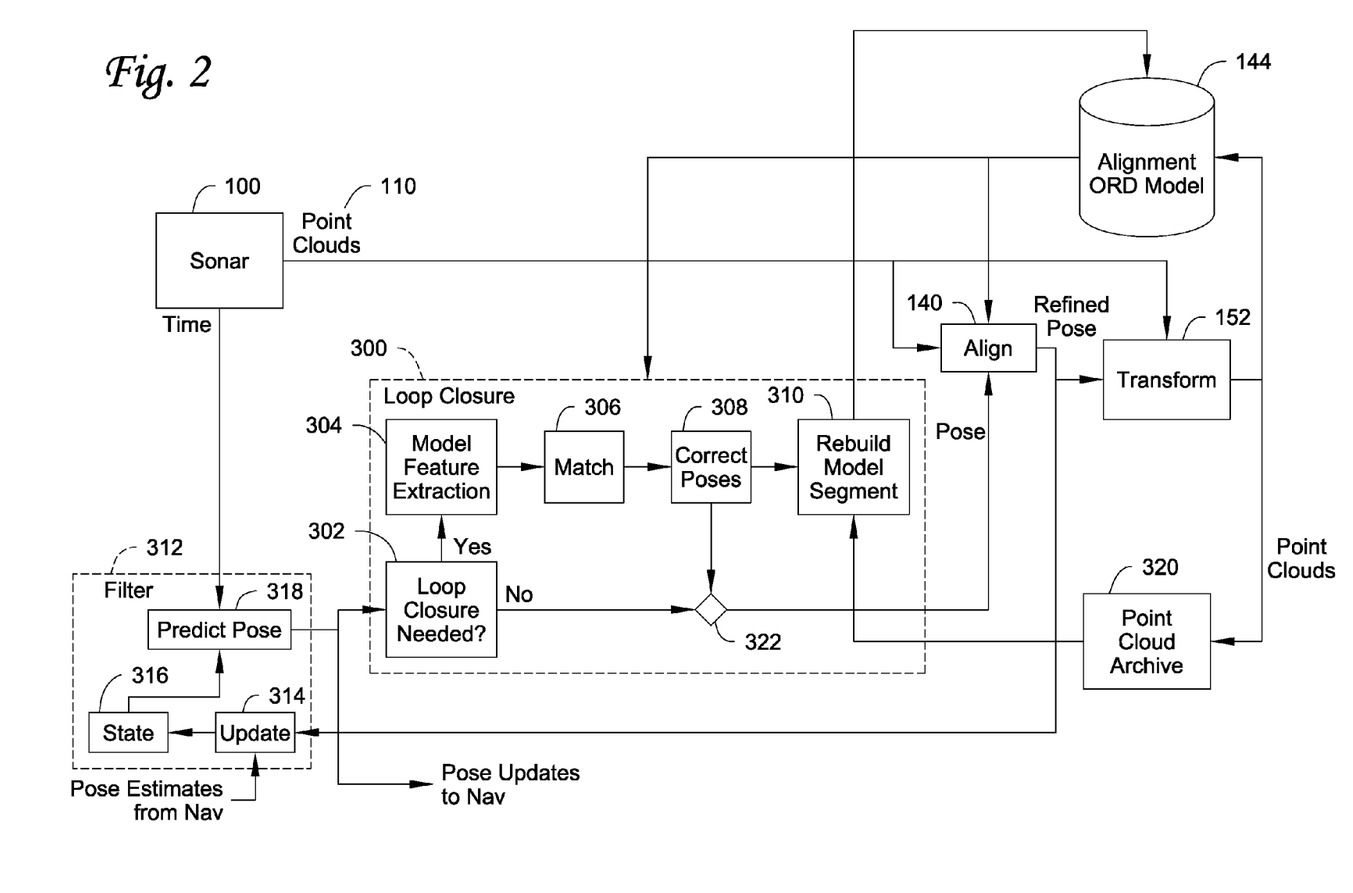
FIG. 2 shows a flow diagram of one embodiment for processing sonar data and position orientation information for building a three dimensional model of an underwater structure.

FIG. 2 is a flow diagram of one embodiment for processing sonar data and position orientation (pose) information for building a three dimensional model of an underwater structure. Sonar data 100 is retrieved by a suitable sensor, which produces for each transmitted sonar pulse (or ping) a 3D image, also called a point cloud 110, that is sent to the alignment block 140. At an initial stage, the alignment model (Alignment Model) is empty, so the initial sonar data collected is used to produce an initial alignment model. As additional sonar data is collected, it is aligned 140 with the Alignment Model 144, using an iterative process, which is further described in FIGS. 3 and 4. It will be appreciated that Align 140 obtains an initial pose estimate from Loop Closure 300.

As additional sonar data is collected the Point Clouds 110 are Aligned 140 to the Alignment Model 144 and Transformed 152 by the Refined Pose computed by Align 140. Transform 152 block may be the same as that shown in FIG. 3 (further described below). It will be appreciated that the Transform 152 uses the Refined Pose to transform sonar points such that they are aligned with the Alignment Model 144, and that blocks 152 in FIGS. 2 and 3 may have different pose inputs, but the function of the blocks is the same. Transformed 152 point clouds can also be stored in the Point Cloud Archive 320, which is a data storage. During the alignment, blocks 140, 152, and 144 represent the iterative looping process (see FIGS. 3 and 4), which aligns and fits the new data with the Alignment Model 144.

Loop Closure 300 receives for each incoming sonar Point Cloud 110 an estimated pose from the Filter 312 and, by referencing the Alignment Model 144, the Loop Closure Needed block 302 determines whether the 3D image at this estimated pose may provide data of two portions of the Alignment Model that have not yet been sensed in a single 3D image. If the Loop Closure Needed block 302 determines that this is not the case, the estimated pose is passed on to Align 140. If the Loop Closure Needed block 302 determines that the 3D image is likely to provide data of two existing portions of the Alignment Model, Model Feature Extraction 304 extracts distinctive features from the two existing portions of the Alignment Model 144. Match 306 then matches these features to and computes the pose correction required to bring the two segments into alignment. Correct Poses 308 checks to see if this pose correction is above a threshold, and if it is not, sends the pose estimate to Align 140. If the pose correction is above a threshold, Correct Poses 308 identifies the portion of the model that needs to be adjusted to bring the two existing model portions into alignment, estimates the pose adjustments that will bring them into alignment, and sends this information to Rebuild Model Segment 310, which recomputes the portion of the model that needs to be adjusted using the corrected poses from Correct Poses 308 and point clouds from the Point Cloud Archive 320. Correct Poses 308 then passes the adjusted estimated pose to align 140 which aligns the new 3D image to the newly adjusted Alignment Model. It will be appreciated that the model feature extraction 304 and match 306 functions of loop closure 300 may be based on the align 140 described in FIG. 3.

As shown, the Filter 312 receives position and orientation estimates, for example from a navigation system, such as an inertial navigation system as well as the refined poses from Align 140. Filter 312 maintains an estimate of the vehicle State 316 (pose and its derivatives) and uses these to Predict 318 the Sonar 100 sensor pose at the times the sonar produces 3D images. Update 314 fuses pose estimates from nav and from Align 140 to update the State 316. It is to be appreciated that one possible implementation of the Filter 312 is the Kalman filter, which is well known.

With reference to the arrow leading from the Filter 312 to Loop Closure 300, it will be appreciated that because alignment occurs with respect to the model being built, the error in each alignment can have a tendency to accumulate over time, which may cause significant error in the Alignment Model. Loop Closure is a process that recognizes when an area that you had seen before is being observed, and uses an alternate alignment process to reduce this error. The pose computed by Predict Pose 318 is used in order to determine whether it is an appropriate time to apply the loop closure process.

In generating the Alignment Model 144 and its subsequent use in building a three dimensional model of the underwater structure, it will be appreciated that multiple sonar pings from the 3D sonar are collected. The information from these pings is turned into multiple samples of new data points which are aligned with the Alignment Model. It will be appreciated that the new data points and each sample can represent a different viewpoint of an area inspected by the 3D sonar. It will also be appreciated that the samples can substantially overlap in most areas so there is a significant redundancy in the 3D data in the Alignment Model. Such multiple and redundant sampling as well as samples of overlapping views can help increase the confidence and viability of the model built.

Details of Alignment and Fit Processing

Figure 3:
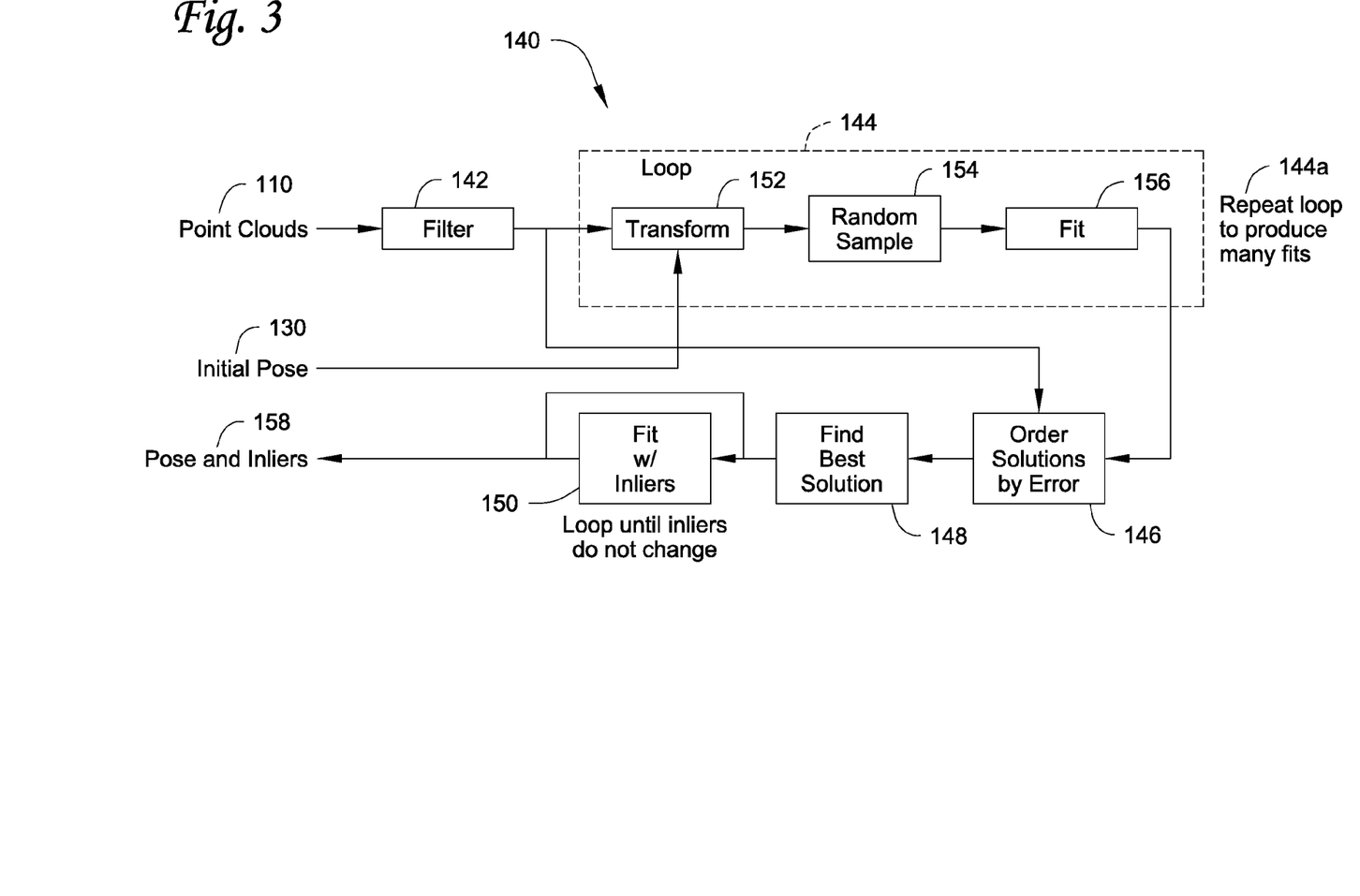
FIG. 3 shows a flow diagram of one embodiment of comparing information from a sonar response to an alignment model (Alignment Model) of an underwater structure, which may be employed in the method shown in FIG. 1.
Figure 4:
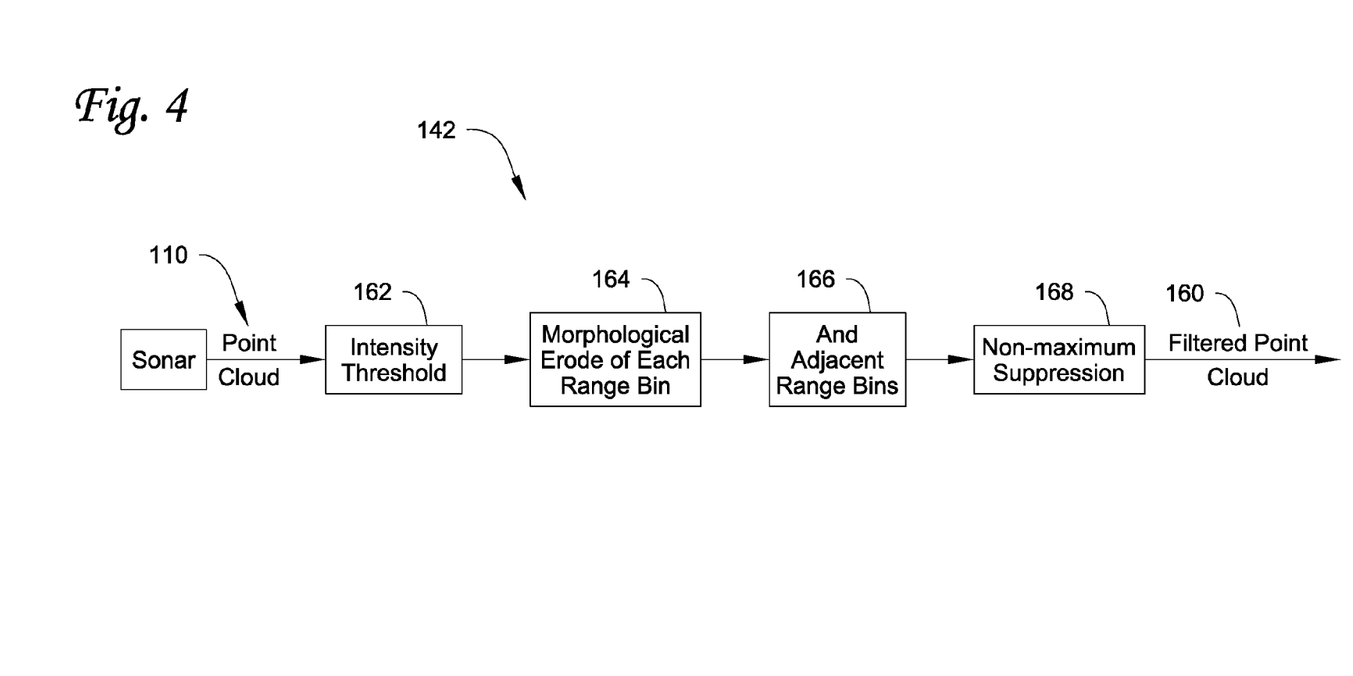
FIG. 4 shows a flow diagram of a filtering process of information obtained from a sonar response, which may be employed in the method shown in FIG. 1.

With further reference to the details of the alignment processing, FIGS. 3 and 4 show flow diagrams of one embodiment of aligning information from a sonar response to the Alignment Model. Generally, in the embodiment shown, a sample of new data points obtained is aligned to the Alignment Model. As shown, the step of aligning includes an iterative method of repeatedly performing a fit processing based on multiple samples of the data points, which is further described below, and where the fit processing includes adjusting the data points sampled to match with the Alignment Model of the three dimensional underwater structure. Generally, alignment and fit processing includes estimating the pose of the sonar to align the new data with the previous data stored in the model.

With reference to the details of FIG. 3, the response from the 3D sonar provides the point clouds 110 (see also FIG. 2) used to perform the alignment process. The point clouds 110 include data points which represent a 3D image of the underwater structure. Due to a usual high level of noise and potential non-useful information that is known to occur in 3D sonar point clouds, the data points in some circumstances are filtered 142 before undergoing alignment.

FIG. 4 shows a flow diagram of one embodiment of the filtering process 142, which may be included as part of the step of obtaining the data points 14 shown in FIG. 1. Filtering process 142 includes filtering the response received from directing the acoustic sonar wave toward the underwater structure, so as to obtain data points useful during alignment. The data from the sonar point cloud 110 is input through a series of data processing and filtering steps, which result in a filtered point cloud 160. In the embodiment shown, the point cloud 110 is input to an Intensity Threshold filter 162. Generally, the filtering process 142 performs morphological operations on the point cloud 110. For example, a Morphological Erode of Each Range Bin 164 is performed, and then Adjacent Range Bins 166 are combined. Box 164 and 166 represent non-limiting examples of certain morphological operations used by the filtering process 142. Next, a Non-maximum Suppression 168 step is performed before the filtered point cloud 160 is obtained. In box 168, the filter process 142 may perform a beam width reduction/compensation processing.

With further reference to FIG. 3, the filtered point cloud 160 proceeds to a processing loop 144. In one embodiment, the processing loop 144 is a RANSAC loop, i.e. random sample consensus, which is an iterative method to estimate parameters of a mathematical model from a set of observed data which contains "outliers". For example, the loop 144 represents a non-deterministic algorithm in the sense that it produces a reasonable result with a certain probability, and where the probability can increase as more iterations are performed. In this case, the parameters of the mathematical model are the position and orientation (pose) of the 3D sonar sensor relative to the pre-existing model of the underwater structure, and the observed data are the 3D points from the sonar. A basic assumption is that the observed data consists of "inliers", i.e., data that can be explained by the mathematical model with some pose parameters, and "outliers" which are data that cannot be thus explained. As a pre-existing three dimensional model is available in the method herein, such an iterative process, given a small set of inliers can be used to estimate the parameters of a pose by computing a pose that fits the data (i.e. 3D sonar data points) optimally to their corresponding closest model points.

As shown in FIG. 3, the loop 144 is a RANSAC loop that includes processing functions Transform 152, Random Sample 154, and Fit 156. In the Transform 152 portion, the point clouds undergo transformation to a coordinate system specified by the initial pose 130 that brings them into approximate alignment with the pre-existing three dimensional model.

As further shown in FIG. 3, an initial pose 130 is input into the Transform 152 portion. In some instances, the initial pose 130 represents the position and orientation from an underwater vehicle's inertial navigation system. In subsequent iterations, the initial pose can be the result from updated knowledge of the first or any preceding alignment that has occurred, while undergoing the procedure shown by FIG. 3. It will be appreciated that a preceding alignment can be appropriately adjusted based on other measurements, such as inertial velocity or acceleration and other inputs from the underwater vehicle's inertial navigation system.

With reference to the available pre-existing 3D model, also called the Alignment Model, the pre-existing 3D model is input to the diagram at 146, 156 and 150, and further described as follows.

In the Random Sample 154 portion of the loop 144, a sample of the points from the point cloud is obtained for further processing and comparison with the pre-existing three dimensional model. The Fit 156 portion of the loop 144 is where the points sampled from Random Sample 154 are adjusted to line up with the pre-existing three dimensional model. That is, the collective position (pose) of the 3D sonar data, e.g. data points, is rigidly adjusted to align the points with the pre-existing three dimensional model. In the Fit 156 portion, the data points can undergo one or more closest point calculations to determine the closest point on the model. The data points and the closest point on the model for each data point are used to compute the correction to the initial pose 130 that optimally aligns the data points and closest points on the model for each data point.

As described, the alignment process is an iterative method to determine a correction to the initial pose 130 that aligns as many points of the 3D sonar data as possible (the inliers) with the pre-existing three dimensional model. In some embodiments, this is achieved from a single ping or detection from the 3D sonar, for example data points from a single acoustic sonar pulse, from which the data point samples are taken. It will also be appreciated that multiple pings of 3D sonar may be employed as needed.

Thus, it will be appreciated that the functions Transform 152, Random Sample 154, and Fit 156 are configured as a loop 144 that can be repeated 144a as necessary to raise the confidence that the best alignment of the 3D sonar data with the pre-existing three dimensional model found in these iterations is truly the best possible alignment. The step of aligning in many embodiments includes repeatedly performing a fit processing based on multiple samples of the data points or data points from multiple acoustic sonar pulses, where the fit processing includes adjusting the data points sampled to align with the pre-existing three dimensional model of the underwater structure. It will be appreciated that in appropriate circumstances, the multiple samples of data points or data points from multiple acoustic sonar pulses that go through the loop 144a can often have overlapping data points, where such overlap can further help increase the probability of finding the best possible alignment of the data points with the model.

That is, the fit is done using a subsample of the data points. Fit uses these points to estimate the pose of the sensor relative to the model. This estimated transform is applied to all data points. The transformed points are then compared to the pre-existing model to determine how well the data matches.

It will also be appreciated that the number of iterations that is appropriate and the amount of overlap used to carry out the alignment and fit can depend upon a balance of several factors. Some factors can include, but are not limited to for example, the amount of processing power employed, how much time is used to collect data, reliability of the data collected and the Alignment Model, how the underwater vehicle is moving, and the complexity of the underwater structure. Where more than one 3D sonar ping is employed, other factors such as for example, the ping rate of the 3D sonar, the potential increase in the initial pose 130 error over time, and the accuracy of the model can be considered in determining how many iterations of the alignment process are needed.

After many random samples of data points have been fitted, a number of solutions can be obtained. FIG. 3 shows portions Order Solutions by Error 146 and Find Best Solution 148. The solutions provided by the loop 144a are ordered (e.g. at 146) so that the best solution can be obtained (e.g. at 148). Once the best solution is obtained, the closest points on the pre-existing 3D model to each of the inliers of this solution are determined, and the correction to the initial pose that best aligns these inliers with the closest points is computed at Fit w/Inliers 150. The updated pose is sent, for example, back to the underwater vehicle's inertial navigation system.

Model Building System

It will be appreciated that the methods of building a three dimensional model of an underwater structure herein may be provided in an autonomous system onboard an underwater vehicle. In some embodiments, the underwater vehicle is an autonomous underwater vehicle (AUV) with the appropriate processing capability to build a model in real time. However, it will be appreciated that the system may wholly or partially onboard other vehicles, such as for example an ROV or a manned sea vessel.

In one embodiment, the system includes a 3D sonar sensor and an inertial navigation system, along with suitable processing capability to carry out model building of underwater structures.

Figure 5:
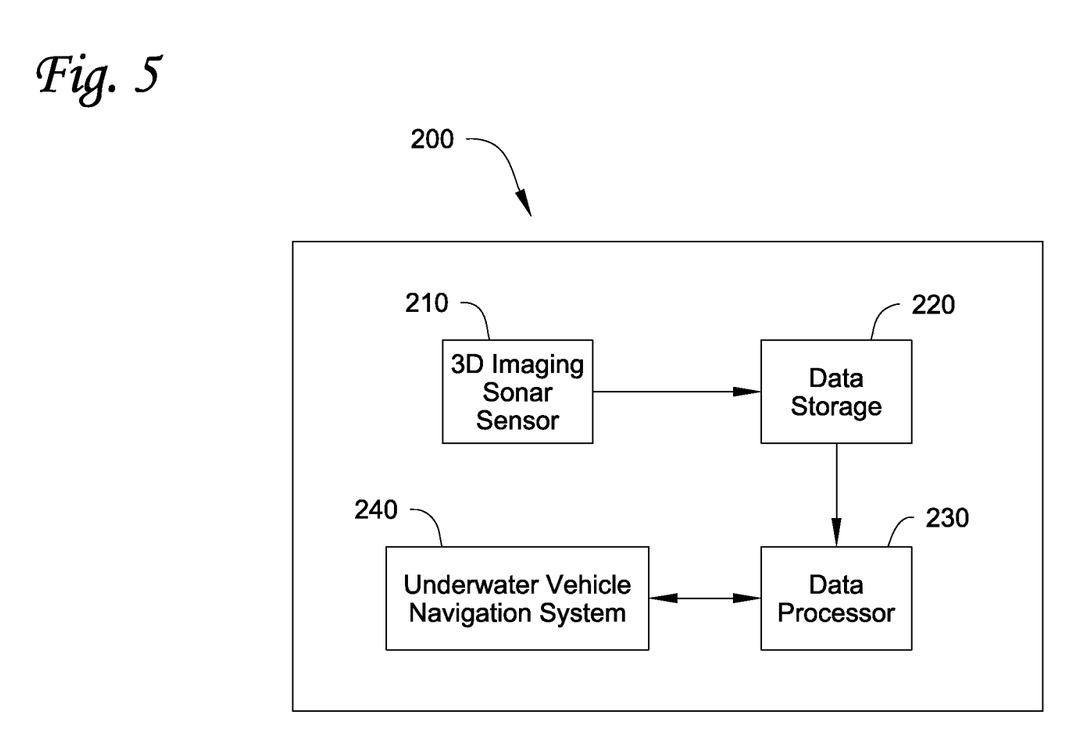
FIG. 5 shows a schematic of a system for building a three dimensional model of an underwater structure.

FIG. 5 shows a schematic of one embodiment of a system 200 for building a three dimensional model of an underwater structure. In appropriate circumstances, the system 200 is onboard and part of an underwater vehicle and has real time processing power, for example about one second and sometimes less.

In the embodiment shown, a 3D imaging sonar sensor 210 can electrically transmit a response from a 3D sonar ping to a data storage 220. The sensor 210 is configured to direct an acoustic sonar wave toward an underwater structure, and to process the acoustic sonar wave reflected from the underwater structure into a three dimensional image of the structure. The data storage 220 is configured to receive a response from the sensor.

A data processor 230 is configured to obtain data points from the data storage 220. The data processor 230 can be, for example, any suitable processing unit. The data points are configured to provide a three-dimensional image of the underwater structure.

The processor 230 is configured to generate an alignment model (e.g. Alignment Model 144) of the underwater structure based from the data points obtained. When additional sonar data is collected by the sensor 210, this data is aligned to the alignment model to build the three dimensional model of the underwater structure.

For example, the processor 230 is configured to obtain new data points from the data storage after additional three dimensional image based sonar is collected by the sensor. As with the initial data points, the new data points are configured to provide a three-dimensional image of the underwater structure. The processor 230 is configured to align a sample of the new data points obtained to the alignment model and, using the alignment techniques described, to build a three dimensional model of the underwater structure with the new data points.

It will be appreciated that the information obtained on the underwater structure can be used to update the vehicle navigation system 240 which is, for example, an inertial navigation system. It will be appreciated that the components of the system 200 can be powered by the underwater vehicle.

The methods and systems described herein above can be used to build a three dimensional model of an existing underwater structure based on 3D sonar scans. Such applications can include, but are not limited to, subsea structure inspection and repair in both commercial and military settings, harbor inspection, and mine detection and/or countermeasures. In one embodiment, data from 3D sonar scans is collected, data from inertial navigation is collected, and the data is logged and processed to generate a 3D image of the scanned underwater structure, or alignment model. The alignment model is a working three dimensional model of the underwater structure, to which further 3D image data can be aligned for change detection. The collection, logging and processing of the data can be performed using the data processing electronics onboard the underwater vehicle, with real time processing capability.

Such a method and system for model building as described herein can be useful when inspecting for damage, deformation of underwater structures. The methods and systems described herein above can be useful, for example, in situations where an underwater vehicle is far from the seafloor, for example over 1000 meters, such that other navigation tools, such as DVL are unavailable. It will be appreciated that no other feature based sensors are necessary and that navigation relative to non-stationary underwater structures may also be possible using the methods and systems herein. The use of 3D sonar allows scanning of complex 3D structures to provide a full six degrees of freedom in pose.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of building a three dimensional model of an underwater structure comprising:
   directing an acoustic sonar wave toward an underwater structure;
   receiving the acoustic sonar wave reflected from the underwater structure, obtaining 3D data points from the acoustic sonar wave reflected from the underwater structure, the data points are configured to provide a three-dimensional image of the underwater structure;
   generating an alignment model of the underwater structure from the data points obtained;
   directing one or more acoustic sonar waves toward an underwater structure and receiving one or more acoustic sonar waves reflected from the underwater structure;
   obtaining new 3D data points from the one or more acoustic sonar waves reflected from the underwater structure, the new data points are configured to provide one or more three-dimensional images of the underwater structure;
   reducing error propagation by a process that includes determining whether the one or more three-dimensional images have data of existing portions of the alignment model that are above a threshold, and adjusting the alignment model when the one or more three-dimensional images have data of existing portions of the alignment model that are above the threshold;
   aligning a sample of the new data points to the alignment model; and
   building a three dimensional model of the underwater structure with the new data points.

2. The method of claim 1, wherein the underwater structure is non-stationary.

3. The method of claim 1, wherein the steps of directing, receiving, obtaining, generating, directing, obtaining, reducing, aligning, and building are performed onboard an underwater vehicle, the underwater vehicle is one of an autonomous underwater vehicle or a remotely operated vehicle.

4. The method of claim 1, wherein the step of obtaining the data points and obtaining the new data points comprises filtering the response received from directing the acoustic sonar wave toward the underwater structure.

5. The method of claim 1, wherein the step of aligning comprises repeatedly performing a fit processing on data points from multiple acoustic sonar pulses, the fit processing comprises adjusting the new data points sampled to match with the alignment model generated.

6. The method of claim 5, wherein the data points from multiple acoustic sonar pulses have overlapping data points.

7. The method of claim 1, wherein the step of generating an alignment model further comprises loop closure processing of at least a first pass of the underwater structure, the loop closure processing is configured to set an initial reference that minimizes error propagation.

8. The method of claim 1, wherein the step of building the three dimensional model comprises aligning multiple samples of new data points with the alignment model.

9. The method of claim 8, wherein each sample represents different viewpoint of an area inspected by the one or more acoustic sonar waves.

10. The method of claim 8, wherein the samples include some overlap of an area inspected by the one or more acoustic sonar waves.

11. The method of claim 1, wherein the aligning comprises repeated alignment and fit processing using a random sample consensus processing loop.

12. A system for building a three dimensional model of an underwater structure comprising:
   a sensor onboard an underwater vehicle, the sensor is configured to direct an acoustic sonar wave toward an underwater structure, the reflected acoustic sonar wave is configured to be processed into a three dimensional (3D) image of the underwater structure;
   a data storage onboard the underwater vehicle that is configured to receive a response from the sensor; and
   a data processor onboard the underwater vehicle,
   the data processor is configured to obtain 3D data points from the data storage, the data points are configured to provide a three-dimensional image of the underwater structure,
   the processor is configured to generate an alignment model of the underwater structure from the data points obtained,
   the processor is configured to obtain new data points from the data storage after additional 3D sonar is collected by the sensor, the new data points are configured to provide a three-dimensional image of the underwater structure,
   the processor is configured to reduce error propagation, where the processor is configured to determine whether the three-dimensional image has data of existing portions of the alignment model that are above a threshold, and is configured to adjust the alignment model when the three-dimensional image has data of existing portions of the alignment model that are above the threshold, and
   the processor is configured to align a sample of the new data points obtained to the alignment model, and build a three dimensional model of the underwater structure with the new data points.

13. The system of claim 12, wherein the processor is configured to repeatedly perform alignment and fit processing using a random sample consensus processing loop.

* * * * *